United States Patent
Shinohara et al.

(10) Patent No.: US 7,975,123 B2
(45) Date of Patent: Jul. 5, 2011

(54) COMPUTER SYSTEM, MANAGEMENT COMPUTER AND STORAGE SYSTEM, AND STORAGE AREA ALLOCATION AMOUNT CONTROLLING METHOD

(75) Inventors: Daisuke Shinohara, Yokohama (JP); Masayuki Yamamoto, Sagamihara (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/538,253

(22) Filed: Aug. 10, 2009

(65) Prior Publication Data

US 2009/0300316 A1 Dec. 3, 2009

Related U.S. Application Data

(63) Continuation of application No. 11/400,187, filed on Apr. 10, 2006, now Pat. No. 7,590,816.

(30) Foreign Application Priority Data

Feb. 23, 2006 (JP) ................................. 2006-047161

(51) Int. Cl.
*G06F 12/02* (2006.01)
(52) U.S. Cl. ............... 711/170; 711/111; 711/E12.002; 711/E12.005; 711/E12.006

(58) Field of Classification Search .................. None
See application file for complete search history.

(56) References Cited

U.S. PATENT DOCUMENTS

| | | | |
|---|---|---|---|
| 5,129,088 A * | 7/1992 | Auslander et al. | 711/1 |
| 5,675,769 A * | 10/1997 | Ruff et al. | 711/112 |
| 5,845,296 A | 12/1998 | Jasuja et al. | 707/205 |
| 6,076,151 A | 6/2000 | Meier | 711/171 |
| 6,817,011 B1 | 11/2004 | Reynolds | 717/130 |
| 2002/0046321 A1 | 4/2002 | Kanai et al. | 711/113 |
| 2003/0084266 A1 | 5/2003 | Knippel et al. | 711/173 |
| 2004/0078518 A1 | 4/2004 | Kuwata | 711/113 |
| 2005/0055603 A1 | 3/2005 | Soran et al. | |

* cited by examiner

Primary Examiner — Michael C Krofcheck
(74) Attorney, Agent, or Firm — Brundidge & Stanger, P.C.

(57) ABSTRACT

To provide a computer system, a management computer and a storage system, and a storage area allocation amount controlling method for improving I/O performance of the host computer. In a computer system comprising a storage system comprising one or more storage devices with storage areas, a host computer which uses a storage area of the storage device, and a management computer for dynamically allocating the storage area in response to an input/output request from the host computer; wherein the management computer monitors dynamic allocation of a real storage area to a storage area in the storage system, and calculates allocation increment amount to the allocated storage area based on the allocation frequency and the total amount of allocation.

2 Claims, 14 Drawing Sheets

FIG.3

| VLU | VLU CONTINUOUS AREA STARTING ADDRESS | ALLOCATED AMOUNT OF INCREMENT |
|---|---|---|
| A | 0 0 0 0 0 0 0 0 | 1 6 K B |
| B | 0 0 0 0 0 0 0 0 | 1 6 K B |
| B | 3 0 0 0 0 0 0 0 | 1 6 K B |
|  |  |  |

FIG.4

| VLU | VLU STARTING ADDRESS | SIZE | ID | STARTING ADDRESS | INITIAL | W |
|---|---|---|---|---|---|---|
| A | 0 0 0 0 0 0 0 0 | 3 2 M B | A | 0 0 0 0 0 0 0 0 | Yes | Yes |
| B | 0 0 0 0 0 0 0 0 | 1 M B | B | 0 0 0 0 0 0 0 0 | Yes | Yes |
| B | 3 0 0 0 0 0 0 0 | 1 M B | C | 0 0 0 0 0 0 0 0 | Yes | Yes |
|  |  |  |  |  |  |  |

FIG.5

| 313-1 | 313-2 | 313-3 | 313-4 | 313-5 | 313 |
|---|---|---|---|---|---|
| DEVICE ID | VLU | TIME | STARTING ADDRESS | SIZE | |
| A | A | 20051001 09:00 | 20000000 | 1 MB | |
| A | B | 20051001 10:00 | 00100000 | 16 KB | |
| A | B | 20051001 12:00 | 00104000 | 16 KB | |
| A | A | 20051001 15:00 | 20100000 | 1 MB | |
| A | B | 20051001 16:00 | 30100000 | 32 KB | |
| A | B | 20051001 18:00 | 30108000 | 32 KB | |
| A | A | 20051002 09:00 | 20200000 | 1 MB | |
| A | B | 20051002 10:00 | 00108000 | 16 KB | |
| A | B | 20051002 12:00 | 0010C000 | 16 KB | |
| A | A | 20051002 15:00 | 20300000 | 1 MB | |
| A | B | 20051002 16:00 | 30110000 | 32 KB | |
| A | B | 20051002 18:00 | 30118000 | 32 KB | |
| A | A | 20051003 09:00 | 20400000 | 1 MB | |
| A | B | 20051003 10:00 | 00110000 | 16 KB | |
| A | B | 20051003 12:00 | 00114000 | 16 KB | |
| A | A | 20051003 15:00 | 20500000 | 1 MB | |
| A | B | 20051003 16:00 | 00080000 | 1 MB | |
| | | | | | |

FIG.9

| VLU | VLU CONTINUOUS AREA STARTING ADDRESS | ALLOCATED AMOUNT OF INCREMENT |
|---|---|---|
| A | 00000000 | 1MB |
| B | 00000000 | 16KB |
| B | 30000000 | 32KB |
| B | 00080000 | 16KB |
|  |  |  |

FIG.10

| VLU | VLU STARTING ADDRESS | SIZE | ID | STARTING ADDRESS | INITIAL | W |
|---|---|---|---|---|---|---|
| A | 00000000 | 38MB | A | 00000000 | Yes | Yes |
| B | 00000000 | 1.1MB | B | 00000000 | Yes | Yes |
| B | 30000000 | 1.1MB | C | 00000000 | Yes | Yes |
| B | 00080000 | 1MB | D | 00000000 | Yes | Yes |
|  |  |  |  |  |  |  |

FIG.11

| NUMBER OF ALLOCATED CONTINUOUS AREAS | FACTOR TO BE ALLOCATED |
|---|---|
| 1 | 1.5 |
| 2 | 1.4 |
| 3 | 1.3 |
| 4 | 1.2 |
| 5 | 1.1 |
| 6 | 1.0 |
| 7 | 0.9 |
| 8 | 0.8 |
| 9 | 0.7 |
| 10 OR MORE | 0.6 |

FIG.13

| | 315-1 | 315-2 | 315-3 | 315-4 | 315 |
|---|---|---|---|---|---|
| | DEVICE ID | VLU | CONTINUOUS AREA STARTING ADDRESS | ALLOCATED SIZE | |
| | A | A | 0 0 0 0 0 0 0 0 | 2 M B | |
| | A | B | 0 0 0 0 0 0 0 0 | 1 6 K B | |
| | A | B | 0 0 0 4 0 0 0 0 | 1 6 K B | |
| | A | B | 0 0 0 8 0 0 0 0 | 1 6 K B | |
| | | | | | |

FIG.17

| VLU | VLU STARTING ADDRESS | SIZE | ID | STARTING ADDRESS | INITIAL | W |
|---|---|---|---|---|---|---|
| A | 00000000 | 38MB | A | 00000000 | Yes | Yes |
| B | 00000000 | 1.1MB | B | 00000000 | Yes | Yes |
| B | 30000000 | 1.1MB | C | 00000000 | Yes | Yes |
| B | 00080000 | 32KB | D | 00000000 | Yes | Yes |
| A | 20600000 | 2MB | A | 20600000 | Yes | No |
| B | 00118000 | 32KB | B | 00118000 | Yes | No |
| B | 30120000 | 64KB | C | 30120000 | Yes | No |
| B | 00088000 | 16KB | D | 00088000 | Yes | No |
|  |  |  |  |  |  |  |

COMPUTER SYSTEM, MANAGEMENT COMPUTER AND STORAGE SYSTEM, AND STORAGE AREA ALLOCATION AMOUNT CONTROLLING METHOD

The present application is based on and claims priority of Japanese patent application No. 2006-047161 filed on Feb. 23, 2006 and is a continuation of U.S. application Ser. No. 11/400,187, filed Apr. 10, 2006 now U.S. Pat. No. 7,590,816, the entire contents of which are hereby incorporated by reference.

BACKGROUND OF THE INVENTION

1. Field of the Invention

The present invention relates to a computer system, management computer and storage system, and storage area allocation amount controlling method, and more specifically to a method for mapping a virtual storage area to a real storage area according to frequency of usage by analyzing usage history.

2. Description of the Related Art

As information technique has been developed, data management is more and more demanded to be efficient. This is why a technique for using resources provided by a storage device from a host computer via a network has been developed. As storage has become more and more adaptive to a network, storage resources are desired to be shared effectively and speedily with dynamically allocating a storage resource to a logical storage unit. In such circumstances, a technique for dynamically allocating a storage area provided by a storage device to data according to an I/O request from a host computer is developed, and storage allocation of usage in case of the early start-up of storage operation or when capacity cannot be determined is realized.

[Patent Document 1] US2005/0055603 specification

A storage area allocation amount controlling method according to a conventional art allocates storage areas by dynamically mapping an address which is not mapped with a real storage area with the real storage area when it receives an I/O request from a host computer. The real storage area which is mapped at allocation has a fixed size. That is to say, capacity designated by the I/O request from a host computer is divided by a fixed size which was at the allocation of the real storage area.

In the case of a storage area allocation amount controlling method according to a conventional art, an allocated size of a real storage area is fixed. That brings about overhead occurs due to division by the fixed allocation size and initialization of the divided storage area when data whose size is over the fixed allocation size is written. Accordingly, I/O performance of the host computer is degraded.

The problem to be solved by the present invention is to provide a computer system, a management computer and a storage system, and a storage area allocation amount controlling method for improving I/O performance of the host computer.

SUMMARY OF THE INVENTION

The present invention reduces overhead due to initialization of divided storage areas by monitoring dynamic allocation of a real storage area to the storage area, calculating an allocation amount for the storage area according to frequency of allocation and the total amount of allocated sizes, and reducing the divided amount of the real storage area. The present invention also reduces overhead due to initialization of a storage area by predicting a real storage allocation amount by a certain period at a predetermined time and allocating the predicted amount.

The present invention is a computer system including a storage system comprised of one or more storage devices with a storage area, a host computer which uses a storage area provided by the storage device, and a management computer for dynamically allocating the storage area provided by the storage device in response to an input output request from the host computer; wherein the management computer monitors dynamic allocation of a real storage area to a storage area in the storage system, and calculates allocation increment amount to an allocated storage area based on the allocation frequency and the total amount of allocation.

The present invention can provide a computer system, a management computer and a storage system, and a storage area allocation amount controlling method which can dynamically allocate a storage area, while improving I/O performance of a host computer.

BRIEF DESCRIPTION OF THE DRAWINGS

FIG. 3 is a diagram showing the virtual logical unit increment managing table in the first embodiment;

FIG. 4 is a diagram showing the virtual logical unit real storage area mapping table in the first embodiment;

FIG. 5 is diagram showing the virtual logical unit usage history in the first embodiment;

FIG. 9 is a diagram showing a virtual logical unit increment management table in the first embodiment;

FIG. 10 is a diagram showing a virtual logical unit real storage area mapping table in the first embodiment;

FIG. 11 is a diagram showing an example of mapping table of the continuity and the coefficient of possible allocations in the first embodiment;

FIG. 13 is a diagram showing virtual logical unit allocation information in the second embodiment;

FIG. 17 is a diagram showing a virtual logical unit real storage area mapping table in the second embodiment.

DETAILED DESCRIPTION OF THE PREFERRED EMBODIMENTS

Preferred embodiments for implementing the present invention will be described.

Embodiments of the computer system, the management computer and the storage system, and the storage area allocation amount controlling method of the present invention will be described with reference to drawings.

First Embodiment

Figure 1:
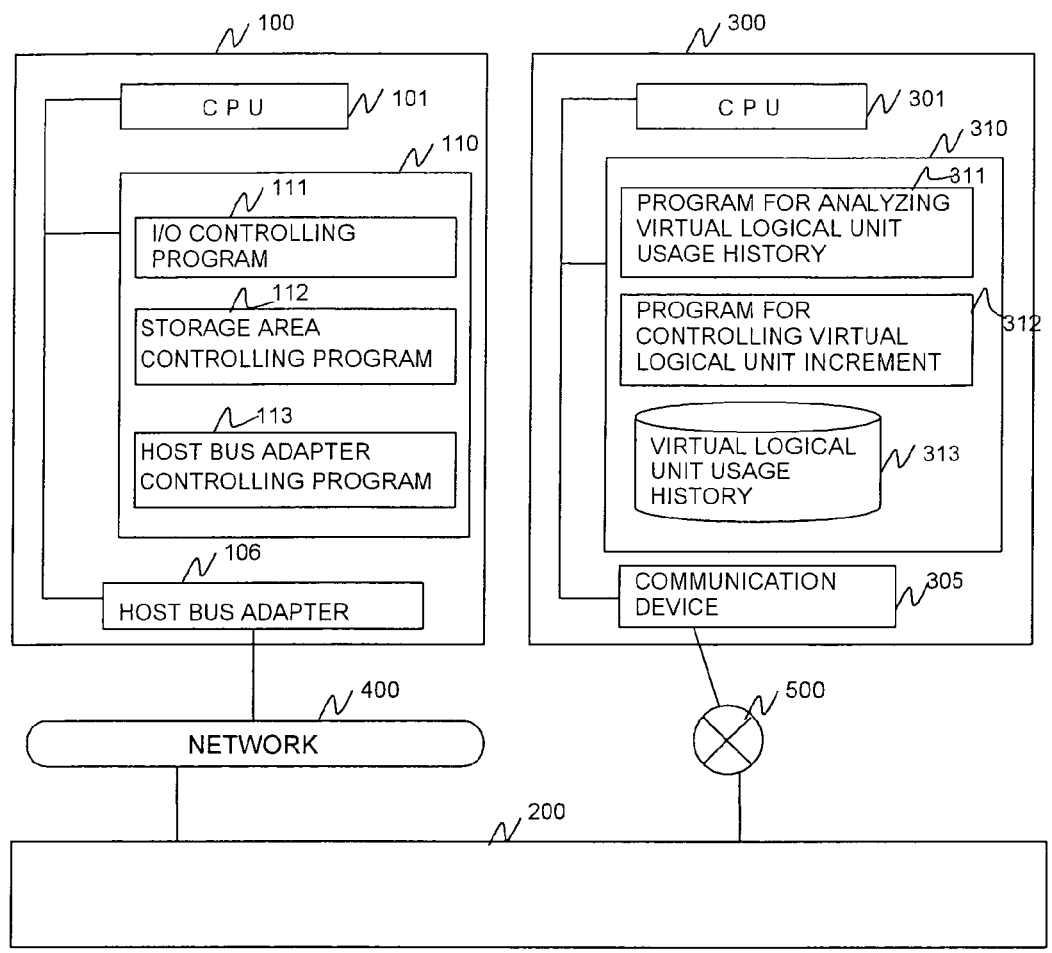
FIG. 1 is a diagram showing the storage area allocation amount controlling method according to the first embodiment.

A first embodiment will be described. The first implementation of the computer system of the present invention will be described with reference to drawings. FIG. 1 is a diagram showing the first implementation of the storage area allocation amount controlling method according to the present invention. In FIG. 1, the reference numeral 100 denotes a host computer, 200 denotes a storage device and 300 denotes the management computer. The host computer 100 and the storage device 200 are connected with each other via a network 400 for storage access. The host computer 100 uses a virtual logical unit 251 provided by the storage device 200 as a storage area. The storage device 200 and the management computer 300 are connected with each other via a management network 500. The management computer 300 controls a virtual logical unit of the storage device 200. The host computer 100 and the storage device 200 can be provided by the number of two, respectively. Although two or more storage devices can be described as configuring a storage system, they may be merely described as a storage device in the example below.

An arrangement of the host computer 100 will be detailed with reference to FIG. 1. The host computer 100 includes a CPU 101, an input device such as a keyboard and a mouse, an output device such as a display and a printer, a communication device such as a LAN adapter, memory, a host bus adapter 106 for controlling sending or receiving of data on a transmission channel such as Fibre Channel or iSCSI, and a storage area 110 such as a hard disk or flash memory. The storage area 110 stores an I/O controlling program 111 for determining an objective device at requesting for inputting or outputting and reading/writing input/output data, a storage area controlling program 112 for controlling input/output data to a secondary storage device, and a host bus adapter controlling program 113 for sending or receiving data via the storage network 400. The I/O controlling program 111 is loaded into memory by the CPU 101 when an I/O request is issued. Then the CPU 101 performs I/O control according to the I/O controlling program 111. The storage area controlling program 112 is loaded into memory by the CPU 101 when an I/O request to the secondary storage device is issued. Then the CPU 101 performs I/O control on the secondary storage device according to the storage area controlling program 112. The host bus adapter controlling program 113 is loaded into memory by the CPU 101 when an I/O request is issued via the storage network 400. Then the CPU 101 performs I/O control via a storage network 400 according to the host bus adapter controlling program 113. All or at least a program of the I/O controlling program 111, the storage area controlling program 112, and the host bus adapter controlling program 113 may be loaded into memory by the CPU 101 when the host computer 100 is booted up and resident on the memory while the host computer 100 is operating.

Figure 2:
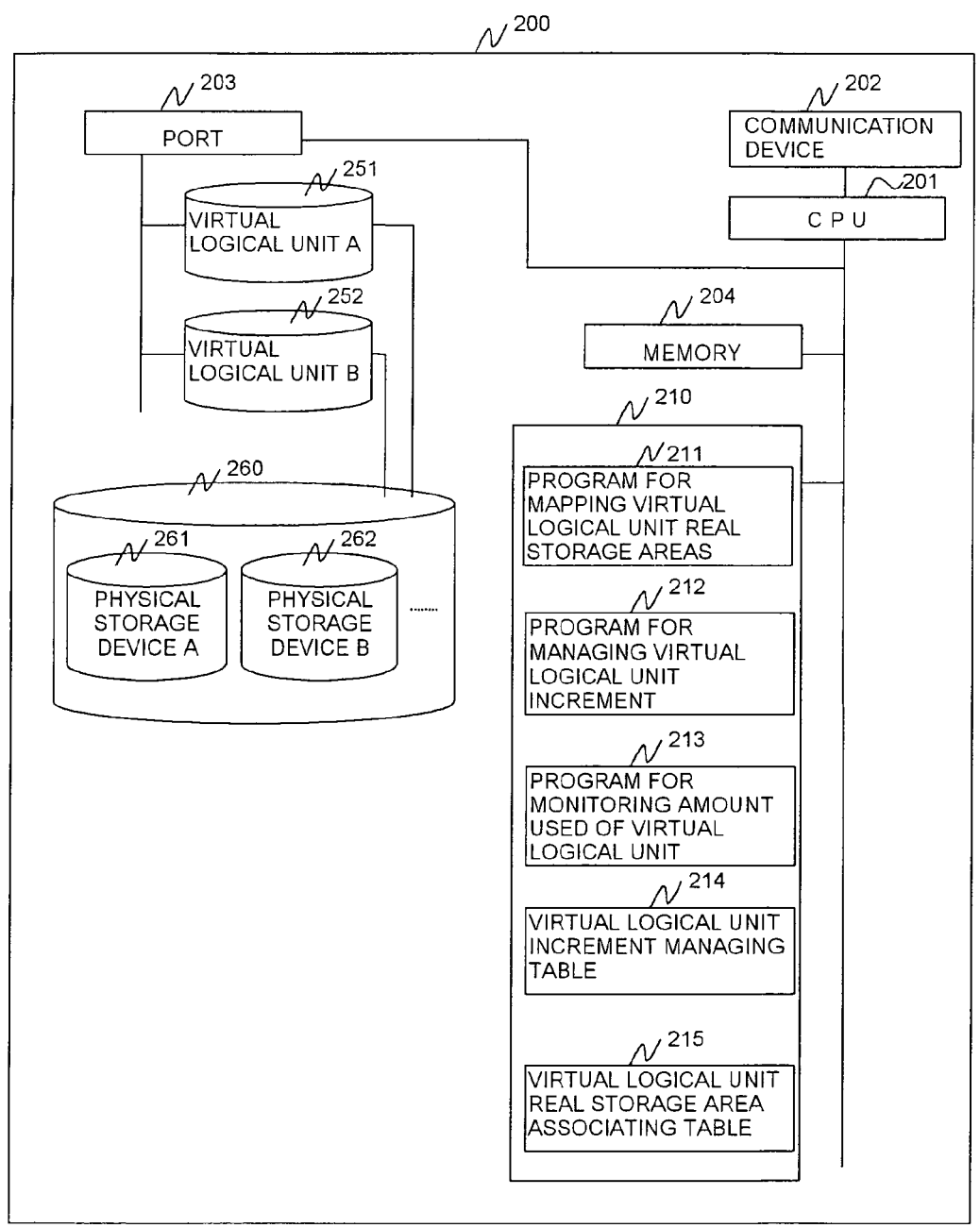
FIG. 2 is a diagram showing a detailed arrangement of the storage device in the first embodiment.

As shown in FIG. 2, the storage device 200 includes a port 203 for processing a request for sending or receiving data via a storage network 400 and a logical unit (logical storage unit) for storing input data by a combination of an input to address and attached data and returning output data by a combination of an output top address and a size. The storage device 200 discloses the logical unit through the port 203 via the storage network 400. The host computer 100 connected with the storage network 400 determines the logical storage by designating identification information of the port 203 and identification information of the logical unit and uses the logical unit as a storage device by sending or receiving data to or from the storage network 400.

The case where the host computer 100 uses a logical unit provided by the storage device 200 via the storage network 400 as a storage device will be described. An I/O request for the host computer 100 is performed through a series of processing below. First, it should be understood that the CPU 101 loads the I/O controlling program 111 into memory and analyzes an I/O request according to the I/O controlling program 111 and that the request is for the secondary storage device. Then, it should be understood that the CPU 101 loads the storage area controlling program 112 into the memory and analyzes the type of the secondary storage device according to the storage area controlling program 112 and that the request is for an external device connected to the storage network 400. The CPU 101 loads the host bus adapter controlling program 113 and performs the I/O request processing for the logical unit according to the host bus adapter controlling program 113.

The logical unit provided by the storage device 200 for the host computer 100 is a logical storage area (volume) and usually comprised of a plurality of hard disks. Addresses in the logical unit are mapped to identifying information of a hard disk and addresses in the hard disk. Mapping between a logical unit and a hard disk is usually determined when the logical unit is created, though, it may not be determined when the logical unit is created. As an example of the case where mapping is not determined when the logical unit is created, the embodiment is that the logical unit is not associated with a hard disk when it is created and the logical unit is dynamically associated with the hard disk when it receives an I/O request from a host computer. Although the logical unit in this case is recognized by the host computer as a usual logical unit, only an address to which the host computer issued an I/O request is associated with a physical storage area and an address to which the host computer issues no I/O request is a logical unit which is not associated with a physical storage area. Therefore, that logical unit is called "virtual logical unit" hereinafter to distinguish it from a usual logical unit.

FIG. 2 is a diagram showing a detailed arrangement of the storage device 200 in the first embodiment (see FIG. 1). The storage device 200 includes a CPU 201, a communication device 202 such as a LAN adapter, a port 203 for processing a request for sending or receiving data via a storage network, memory 204, a storage area 210 such as a hard disk or flash memory, and one or more storage pool 260. The storage pool 260 is composed of one or more physical storage devices. Although two physical storage devices of a physical storage device A261 and a physical storage device B262 are shown in FIG. 2, any number of the physical storage devices may be included. The physical storage device is a device for providing a logical storage area and is mapped to an address in a hard disk which is a physical storage area. Although the storage pool 260 is associated with one or more virtual logical units, the virtual logical unit may not be associated therewith. Although the two virtual logical units of a virtual logical unit A251 and a virtual logical unit B252 are associated with the storage pool 251 in FIG. 2, any number of the virtual logical units may be included. The host computer connected with a storage network through the port 203 uses the virtual logical unit as a storage area. A virtual logical unit is created where it is not mapped with a hard disk and is dynamically mapped with a physical storage area when an address to which the host computer issues an I/O request is associated with a physical storage area. In FIG. 2, the virtual logical unit is indirectly mapped with a hard disk as it is directly associated with a physical storage device whose relationship with the hard disk is determined without being directly associated with the hard disk. Although the physical storage device may be directly composed of a hard disk, it may be composed of a group of parities which is formed by performing the RAID technique such as a stripe, a mirror, a parity or the like on a plurality of hard disks. A block which is one of the blocks which are a group of parities divided by a fixed size may be treated as a physical storage device.

The storage area 210 stores a program for mapping a virtual logical unit real storage area 211 for mapping an address in the virtual logical unit, which is a real storage area, with an address in a physical storage device; a program for managing virtual logical unit increment 212 for controlling a real storage area allocated amount when a host computer issues an I/O request to an address which is not mapped with a real storage area of a virtual logical unit; a program 213 for monitoring amount used of virtual logical unit for managing a history of a real storage area allocation amount of a virtual logical unit; a virtual logical unit increment managing table 214 for showing a real storage area allocation amount when the host computer issues an I/O request for an address which is not mapped with a real storage area of a virtual logical unit; and a virtual logical unit real storage area mapping table 215 showing mapping between an address in a virtual logical unit and an address of a physical storage device.

The virtual logical unit real storage area mapping program 211 is loaded into the memory 204 by the CPU 201 when the host computer issues an I/O request to an address of a virtual logical unit which is not mapped with a real storage area. When the CPU 201 maps the address in the virtual logical unit with the address in the physical storage device of a virtual logical unit according to the program for mapping virtual logical unit real storage areas 211 and receives a real storage area mapping request for a logical unit through a communication device 202, the CPU 201 maps the address of the virtual logical unit with the address of the physical storage device.

The program for managing virtual logical unit increment 212 is loaded in the memory 204 by the CPU 201 when the CPU 201 receives a request for changing an increment value via the communication device 202. The CPU 201 changes the real storage area allocation amount for the virtual logical unit according to the program for managing virtual logical unit increment 212.

The program for monitoring amount used of virtual logical unit 213 is loaded into the memory 204 by the CPU 201 when the host computer issues an I/O request to an address in a virtual logical unit which is not mapped with a real storage area. When the CPU 201 stores a real storage area allocation amount of the virtual logical unit according to the program for monitoring amount used of virtual logical unit 213, and receives a request for acquiring the logical unit amount used through the communication device 202, the CPU 201 acquires and returns the logical unit amount used.

All or at least one of the program for mapping the virtual logical unit real storage area 211, the program for managing virtual logical unit increment 212, and the program for monitoring amount used of virtual logical unit 213 may be loaded into the memory 204 by the CPU 201 when the storage device 200 is booted up and resident in the memory 204, while the storage device 200 is operating.

FIG. 3 shows an example of a virtual logical unit increment managing table 214 stored in the storage area 210 of the storage device 200. The virtual logical unit increment managing table 214 has a virtual logical unit (VLU) ID 214-1 representing identifying information on a virtual logical unit in the storage device 200, a virtual logical unit (VLU) continuous area starting address 214-2 representing a starting address in a continuous area mapped with a physical storage device in a virtual logical unit, and an allocation increment 214-3 representing allocation amount when an I/O request is issued for an address which continues with the continuous area mapped with a physical storage device in a virtual logical unit and is not mapped with the physical storage device as data. The continuous storage area starting at the virtual logical unit continuous area starting address 214-2 is an allocated storage area.

In the example of FIG. 3, the allocation increment amount 16 KB is allocated to an address which is not mapped with a physical storage device in a continuous area starting at the address 00000000 of the virtual logical unit A when an I/O request for the address is issued. The allocation increment amount 16 KB is also allocated to an address which is mapped with a physical storage device in a continuous area starting at the address 00000000 or the address 30000000 of the virtual logical unit B, respectively, even when an I/O request for the address is issued.

FIG. 4 shows an example of the virtual logical unit real storage area mapping table 215 stored in the storage area 210 of a storage device 200. The virtual logical unit real storage area mapping table 215 has a virtual logical unit (VLU) ID 215-1 representing identifying information on a virtual logical unit in the storage unit 200; a virtual logical unit (VLU) starting address 215-2 representing a starting address of continuous area mapped with a physical storage device in a virtual logical unit; a size 215-3 representing a size of a continuous area mapped with a physical storage device in the virtual logical unit; a physical storage device ID 215-4 representing identifying information on a physical storage device mapped with a virtual logical unit; a physical storage device starting address 215-5 representing a starting address of the physical storage device mapped with a virtual logical unit; an initialized flag 215-6 representing whether a continuous area of a virtual logical unit is initialized or not; and a writing issuing (W) flag 215-7 representing whether an output request has been issued to the continuous area of a virtual logical unit as data.

In the example of FIG. 4, the continuous area in the size 32 MB starting at the address 00000000 in the virtual logical unit A is mapped with the continuous area in the size 32 MB starting at the address 00000000 of the physical storage device A, and initialization completes (Yes) and the data has already been written (Yes). The continuous area in the size 1 MB starting at the address 00000000 of the virtual logical unit B is mapped with the continuous area in the size 1 MB starting at the address 00000000 of the physical storage device B, and initialization completes (Yes) and the data has already been written (Yes). The continuous area in the size 1 MB starting at the address 30000000 of the virtual logical unit B is mapped with the continuous area in the size 1 MB starting at the address 00000000 of the physical storage device C, and initialization completes (Yes) and the data has already been written (Yes).

An arrangement of the management computer 300 in FIG. 1 will be detailed. The management computer 300 includes a CPU 301, an input device such as a keyboard or a mouse, an output device such as a display and a printer, memory, a communication device such as a LAN adapter or the like, and a storage area 310 such as a hard disk or flash memory. The storage area 310 stores program for analyzing virtual logical unit usage history 311 for analyzing a frequency of mapping the virtual logical unit to the physical storage device for each I/O request or as a new I/O request is issued to an unused address of a virtual logical unit in a certain period by obtaining usage history information of the virtual logical unit provided by the storage device; a program for controlling virtual logical unit increment 312 for changing allocation amount based on the result of analyzing the virtual logical unit and a virtual logical unit usage history 313 showing history information such as a time when the virtual logical unit and the physical storage device are mapped with each other and allocation amount.

The program for analyzing virtual logical unit usage history 311 is loaded into memory by the CPU 301 when an administrator requests it to be performed, and the CPU 301 performs analyzing process by obtaining a usage history of a virtual logical unit through the communication device 305 according to the program for analyzing virtual logical unit usage history 311 and calculates allocation amount of the virtual logical unit.

An example of allocation amount to be calculated will be described. The allocation amount is calculated based on allocation frequency and the total size of allocation for each objective virtual logical unit.

allocation amount=the total size of allocation/the number of allocations=an average value of allocation size The total size of allocation is the total size of allocation in a recent certain period and is obtained by the maximum value or the average value×the safe rate. The number of allocations is the allocated number in a certain period.

After the CPU 301 calculated the allocation amount of the virtual logical unit according to the program for analyzing virtual logical unit usage history 311, the program for controlling virtual logical unit increment 312 is loaded into memory by the CPU 301. Then the CPU 301 changes the real storage area allocation amount for the virtual logical unit through the communication device 305 according to the program for controlling virtual logical unit increment 312.

Both of or at least either of the program for analyzing virtual logical unit usage history 311 and the program for controlling virtual logical unit increment 312 may be loaded into memory by the CPU 301 when the management computer 300 starts and be resident in the memory while the management computer 300 is operating.

FIG. 5 shows an example of the virtual logical unit usage history 313 stored in the storage area 310 of the management computer 300. The virtual logical unit usage history 313 has as data a device ID 313-1 representing identifying information on a storage device, a virtual logical unit (VLU) ID 313-2 representing identifying information on a virtual logical unit in a storage device, a time 313-3 representing a time when the virtual logical unit is mapped to the physical storage device, a starting address 313-4 representing a top address of a continuous area of the virtual logical unit when the virtual logical unit is mapped to the physical storage device, and a size 313-5 representing an allocation size when the virtual logical unit is mapped to the physical storage device.

In the example of FIG. 5, data of size 1 MB is written in the storage area with a top address of the address 20000000 of the virtual logical unit A in the storage device A at the time 9:00 on Oct. 1, 2005.

Figure 6:
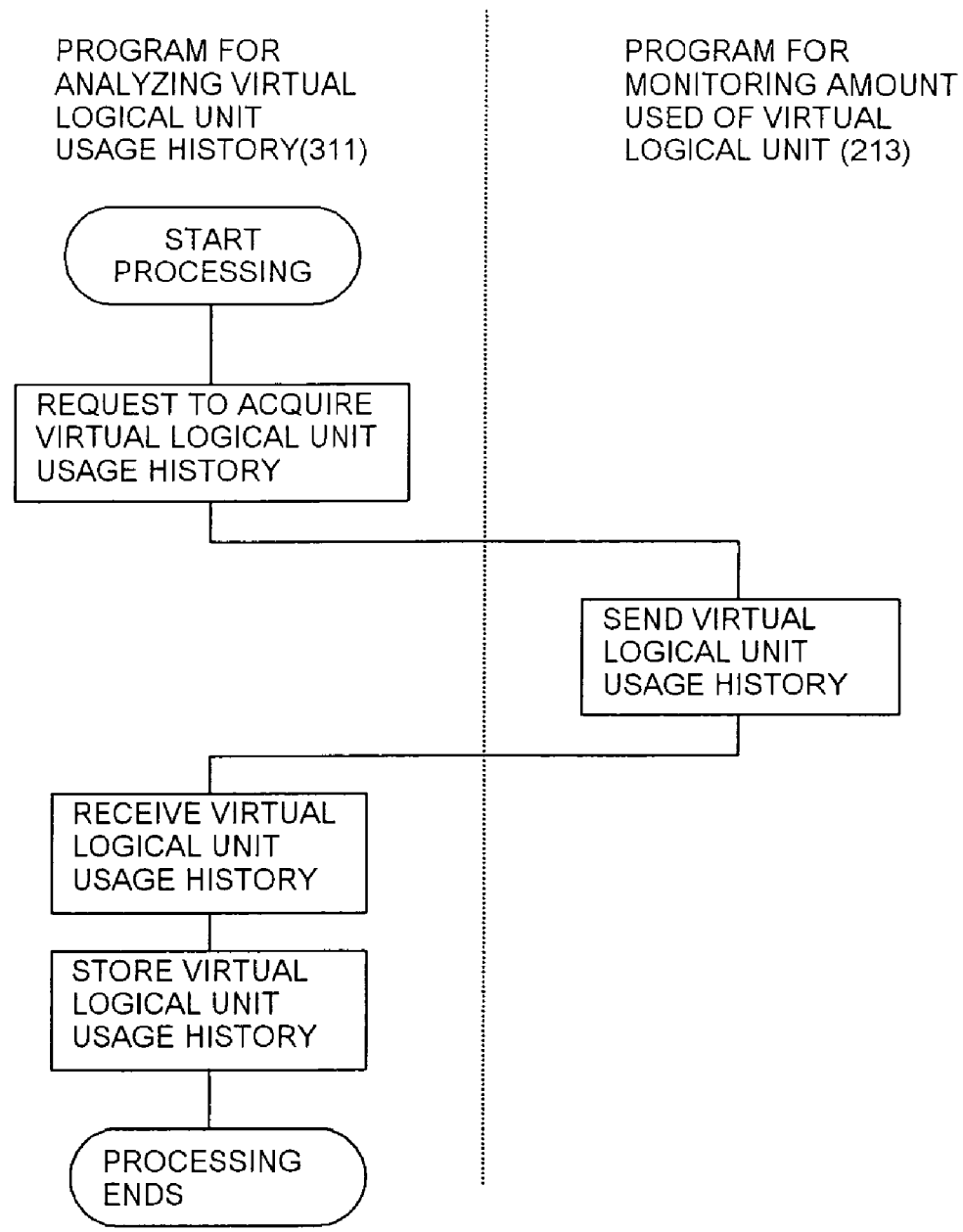
FIG. 6 is a flowchart showing process of storing virtual logical unit usage history in the first embodiment.

FIG. 6 is a diagram showing an example of a processing flow for the management computer 300 to obtain a usage history of a virtual logical unit from the storage device 200 and store the usage history of the virtual logical unit in the virtual logical unit usage history 313. First, the CPU 301 of the management computer 300 requests the storage device 200 to obtain a virtual logical unit usage history according to the program for analyzing virtual logical unit usage history 311. The CPU 201 of the storage device 200 receives the virtual logical unit usage history obtaining request and sends the virtual logical unit usage history obtained in response to the request according to the program for monitoring amount used of virtual logical unit 213. When the CPU 301 of the management computer 300 receives the virtual logical unit usage history from the storage device 200, it stores the history in the virtual logical unit usage history 313. Then, the process ends.

Figure 7:
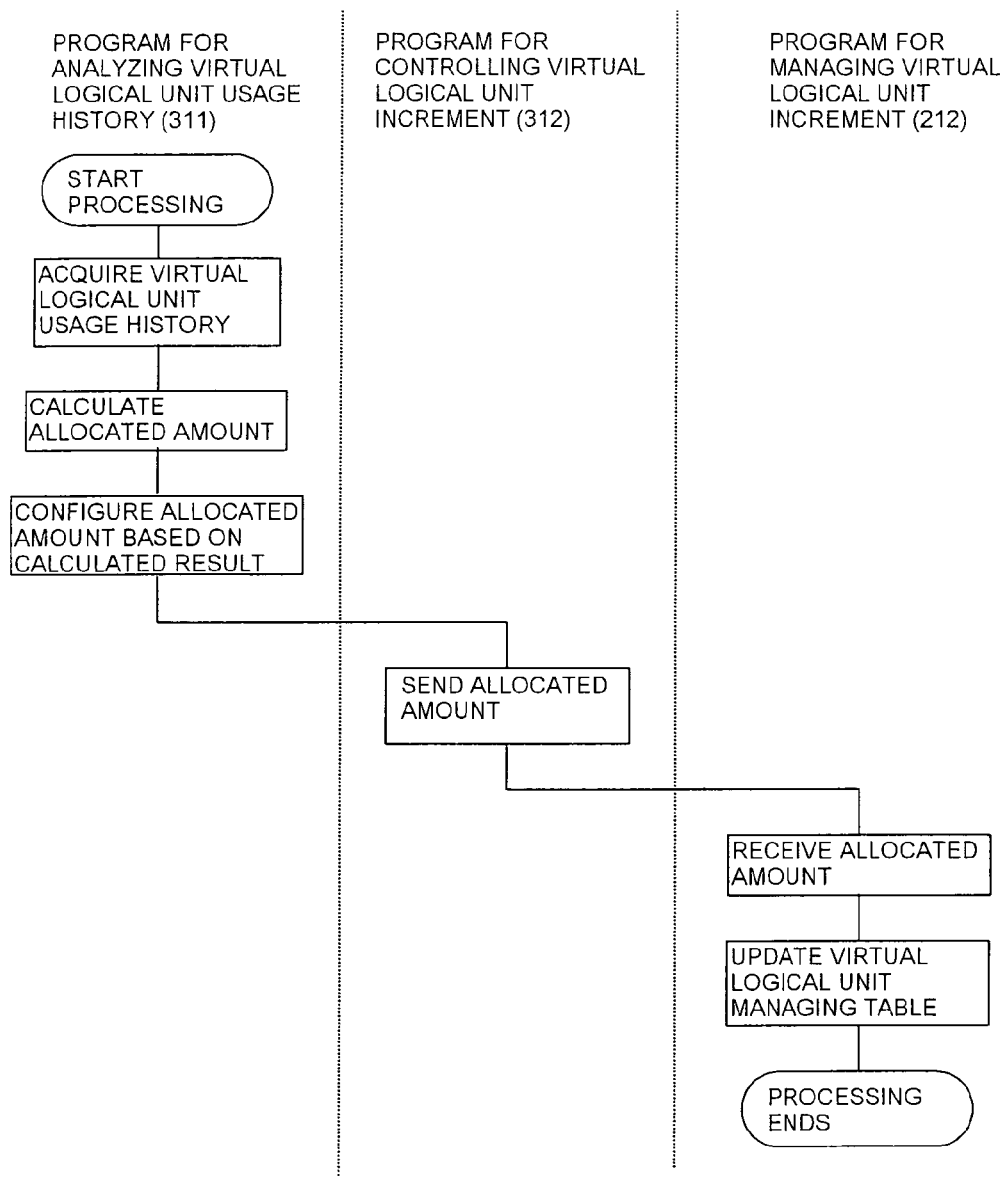
FIG. 7 is a flowchart showing process of setting virtual logical unit increment amount in the first embodiment.

FIG. 7 is a diagram showing an example of a processing flow for the management computer 300 to analyze usage history information of a virtual logical unit stored in the virtual logical unit usage history 313 and change an allocation amount for the virtual logical unit. First, the CPU 301 of the management computer 300 obtains the virtual logical unit usage history 313 and calculates the allocation amount for the virtual logical unit according to the program for analyzing virtual logical unit usage history 311, and sets the allocation amount based on the result of the calculation. Then, the CPU 301 sends the set allocation amount to the storage device 200 according to the program for controlling virtual logical unit increment 312. The CPU 201 of the storage device 200 receives the allocation amount and updates the virtual logical unit management table according to the program for managing virtual logical unit increment 212. Then, the process ends.

Figure 8:
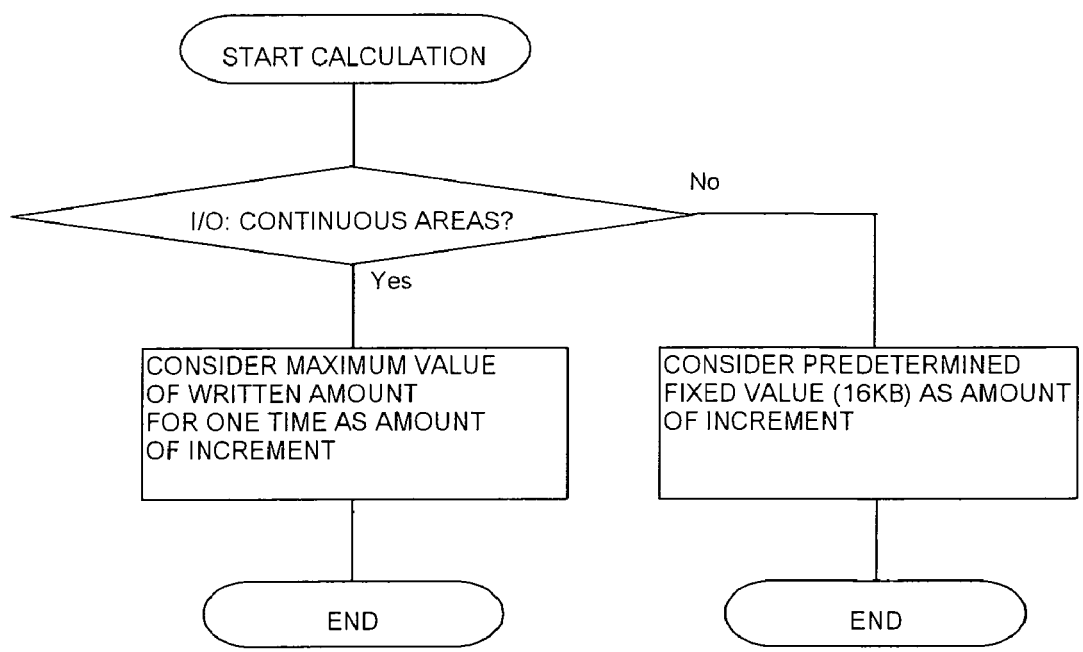
FIG. 8 is a flowchart showing process of determining a virtual logical unit increment amount in the first embodiment.

FIG. 8 is a diagram showing an example of a processing flow for the CPU 301 of the management computer 300 to analyze usage history information of a virtual logical unit stored in a virtual logical unit usage history 313 and calculates the allocation amount for the virtual logical unit. First, the CPU 301 determines whether the writing request is for a continuous area at the analyzing or not, according to the program for analyzing virtual logical unit usage history 311. If the request is for the continuous area, the CPU 301 makes the maximum value of the writing value for one time as an increment value. If the request is not for the continuous area, i.e., for non-continuous area, the CPU 301 makes a predetermined fixed value as an increment value. Although the fixed value is 16 KB in FIG. 8, an administrator may set any value for the fixed value.

FIGS. 9 and 10 represent the contents of the virtual logical unit increment management table 214 and the virtual logical unit real storage area mapping table 215 after the virtual logical unit usage history shown in FIG. 5 is generated, respectively, while the contents of the virtual logical unit increment management table 214 are shown in FIG. 3 and the contents of the virtual logical unit real storage area mapping table 215 is shown in FIG. 4. As such, according to this embodiment, as a storage area is dynamically allocated, overhead due to division by an allocation increment amount or initialization of the divided storage area does not occur when data in size exceeding the fixed allocation size is written. That does not cause decrease of input or output performance of the host computer.

Although the allocation amount of the increment is calculated based on the allocation frequency and the total size of allocation in the embodiment mentioned above, the allocation amount can be calculated based on the allocation frequency, the total size of allocation, and continuity of the allocation areas. The continuity of the allocation areas refers to the number of combinations of allocated areas and the non-allocated areas in a storage area, in which the allocated areas and the non-allocated areas alternate. An example of such a calculation based on the allocation frequency, the total size of the allocation, and the continuity of the allocation areas is: allocation amount=(total size of allocation/the number of allocations)×(coefficient according to continuity)=(average value of allocation size)×(coefficient according to continuity). Here, the total size of allocation is the total size of allocation in a certain period, the number of allocations is the number of allocations in a certain period, and the coefficient according to continuity is the coefficient of possible allocation according to the continuity at allocation. FIG. 11 shows examples of the coefficient of possible allocation. The coefficient of possible allocation preferably decreases as the number of the allocated continuous areas increases.

Figure 12:
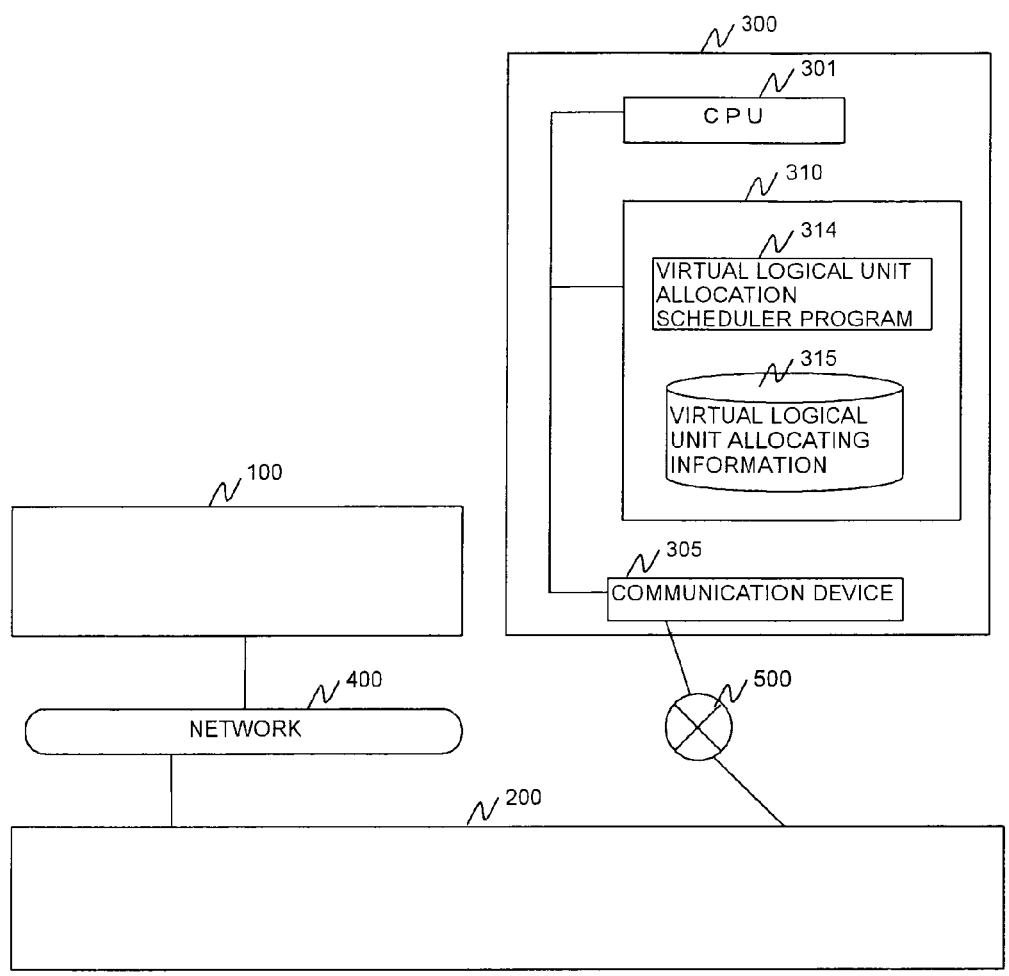
FIG. 12 is a diagram showing a storage area allocation amount controlling method in the second embodiment.

Now, the second embodiment will be described. FIG. 12 is a diagram showing the second embodiment of a storage area allocation amount controlling method in the computer system according to the present invention. In FIG. 12, the reference numeral 100 denotes a host computer, 200 denotes a storage device and 300 denotes a management computer. The host computer 100 and the storage device 200 are connected with each other via a network 400 for storage access. The host computer 100 uses a virtual logical unit provided by the storage device 200 as a storage area. The storage device 200 and the management computer 300 are connected with each other via a management network 500. The management computer 300 controls a virtual logical unit of the storage device 200.

Arrangements of the host computer 100 and the storage device 200 of the second embodiment are the same as those of the first embodiment (see FIGS. 1 and 2). The management computer 300 in this embodiment additionally includes a virtual logical unit allocation scheduler program 314 and virtual logical unit allocation information 315 in a storage area 310 in the arrangement of the first embodiment (see FIG. 1).

The virtual logical unit allocation scheduler program 314 is loaded into memory by the CPU 301 at a time preset by an administrator. Then, the CPU 301 predicts the amount of the real storage area to be allocated to the virtual logical unit in a certain period such as a day, a week or a month according to the virtual logical unit allocation scheduler program 314, and instructs the virtual logical unit to perform the real storage area allocation for the predicted amount through the communication device 305.

FIG. 13 shows an example of the virtual logical unit allocation information 315 stored in the storage area 310 of the management computer 300. The virtual logical unit allocation information 315 has as data a device ID 315-1 representing identifying information on a storage device, a virtual logical unit (VLU) ID 315-2 representing identifying information of the virtual logical unit in the storage device, a continuous area starting address 315-3 representing a top address of the continuous area of the virtual logical unit which allocates the real storage area, and an allocation size 315-4 representing the size of the real storage area to be allocated to the virtual logical unit.

In the example in FIG. 13, the real storage area in the allocation size of 2 MB is allocated to the storage area with the address 00000000 of the virtual logical unit A in the storage device A as the top address.

Figure 14:
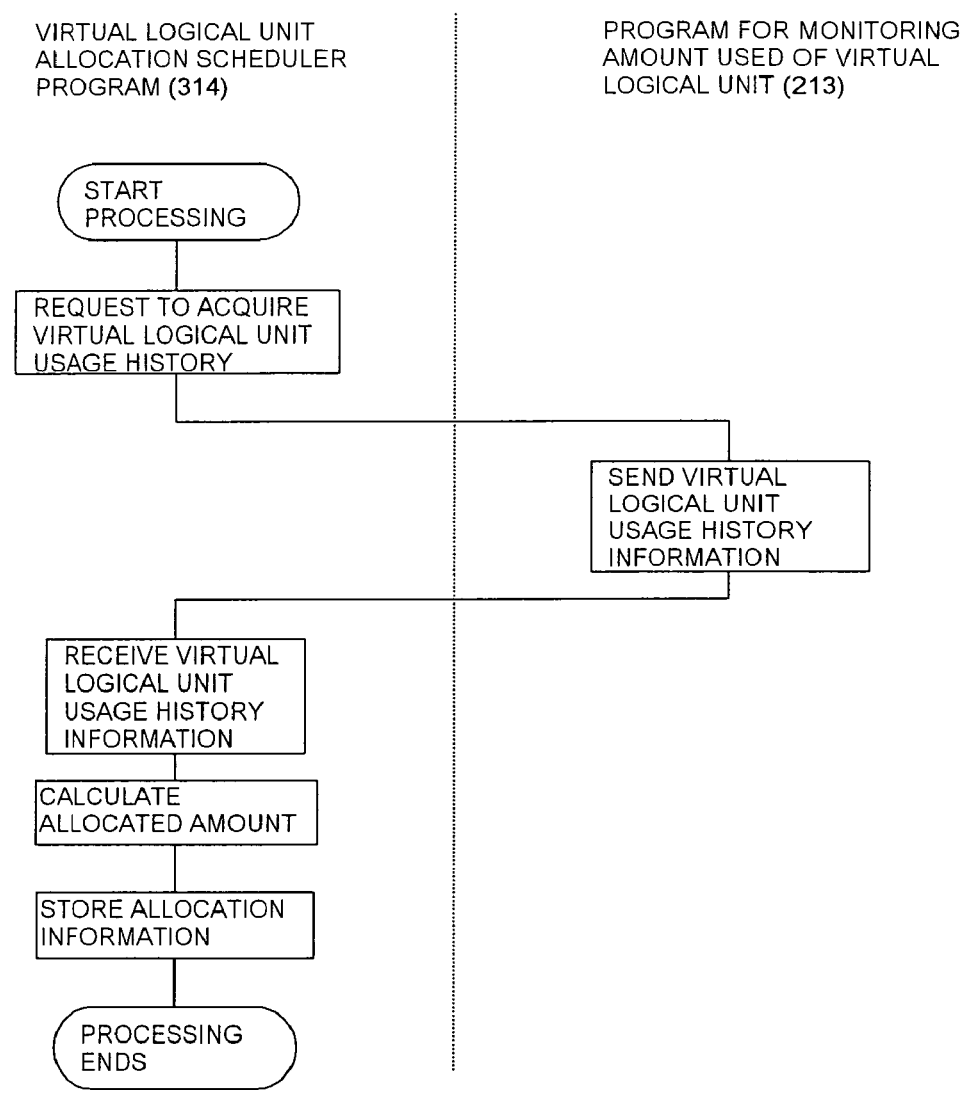
FIG. 14 is a flowchart showing process of storing virtual logical unit allocation information in the second embodiment.

FIG. 14 is a diagram showing an example of a processing flow for the management computer 300 to obtain a usage history of the virtual logical unit from the storage device 200 and stores allocation information for the virtual logical unit in the virtual logical unit allocation information 315. First, the CPU 301 in the management computer 300 requests the storage device 200 to obtain the virtual logical unit usage history according to the virtual logical unit allocation scheduler program 314. The CPU 201 of the storage device 200 receives the virtual logical unit usage history obtaining request and sends the obtained virtual logical unit usage history information according to the program for monitoring amount used of virtual logical unit 213. The CPU 301 of the management computer 300 receives the virtual logical unit usage history information from the storage device 200 according to the virtual logical unit allocation scheduler program 314, calculates the allocation amount for the virtual logical unit, and stores it in the virtual logical unit allocation information 315. Then, the process ends. The allocation amount to be calculated is assumed as the same as that in the first embodiment.

Figure 15:
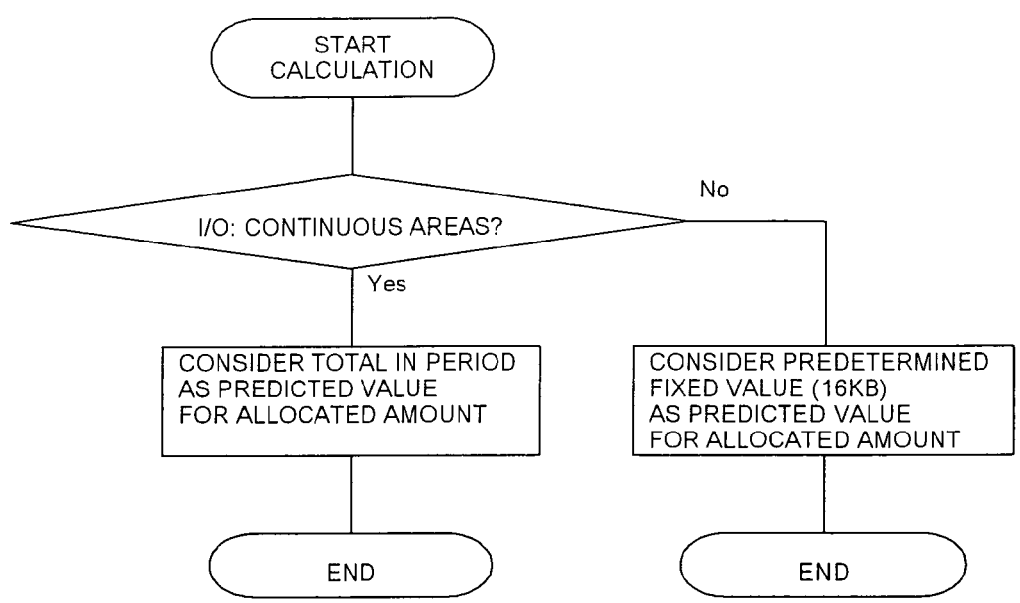
FIG. 15 is a flowchart showing process of determining a predicted amount of allocation for a virtual logical unit in the second embodiment.

FIG. 15 is a diagram showing an example of a processing flow for the CPU 301 of the management computer 300 to analyze a virtual logical unit usage history and calculate a predicted amount of allocation for the virtual logical unit. First, the CPU 301 determines whether the writing request is for a continuous area at the analyzing or not, according to the virtual logical unit allocation scheduler program 314. If the request is for the continuous area, the CPU 301 makes the total of the allocation amount in a certain period as a predicted value of an allocation amount. If the request is not for the continuous area, i.e., for non-continuous area, the CPU 301 makes a predetermined fixed value as a predicted value of the allocation amount. Although the fixed value is 16 KB in FIG. 14, an administrator may set any value for the fixed value.

Figure 16:
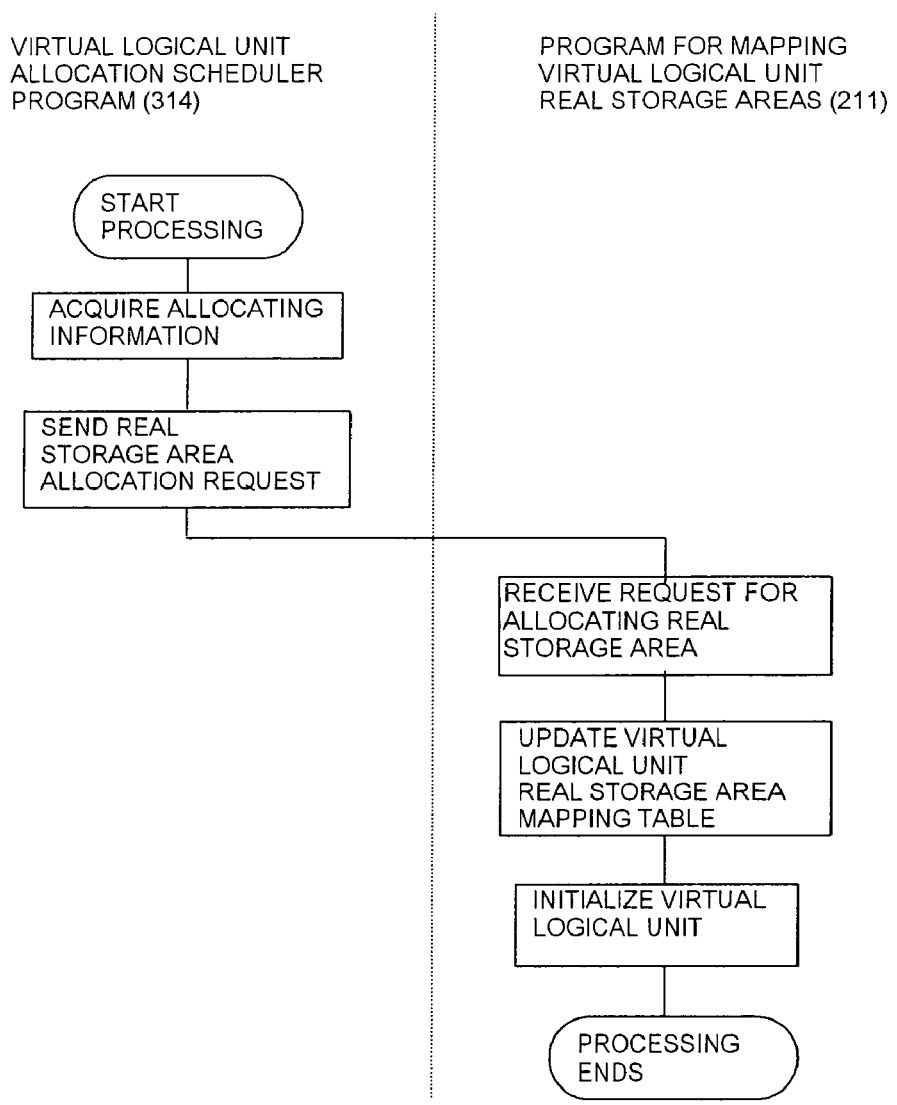
FIG. 16 is a flowchart showing process of allocating a virtual logical unit in the second embodiment.

FIG. 16 is a diagram showing an example of a processing flow for the management computer 300 to obtain allocation information stored in the virtual logical unit allocation information 315 and performs the real storage area allocation on the virtual logical unit. First, the CPU 301 in the management computer 300 obtains the virtual logical unit allocation information 315 according to the virtual logical unit allocation scheduler program 314. Then, the CPU 301 sends a request to allocate real storage area of the virtual logical unit to the storage device 200 according to the virtual logical unit allocation scheduler program 314. The CPU 201 in the storage device 200 receives the real storage area allocation request, updates the virtual logical unit real storage area mapping table, and initializes the virtual logical unit according to the virtual logical unit real storage area mapping program 211. Then, the process ends.

FIGS. 9 and 10 represent the contents of the virtual logical unit increment management table 214 and the virtual logical unit real storage area mapping table 215 after the virtual logical unit usage history shown in FIG. 5 is generated, respectively, while the contents of the virtual logical unit increment management table 214 is shown in FIG. 3 and the contents of the virtual logical unit real storage area mapping table 215 is shown in FIG. 4. As such, according to this embodiment, as a storage area is dynamically allocated, overhead due to division by an allocation increment amount or initialization of the divided storage area does not occur when data in size exceeding the fixed allocation size is written. That does not cause decrease of input or output performance of the host computer.

FIG. 17 represents the contents of the virtual logical unit real storage area mapping table 215 after the CPU 301 performs allocation according to the virtual logical unit allocation scheduler program 314 after the virtual logical unit usage history shown in FIG. 5 is generated, while the contents of the virtual logical unit allocation information 315 is shown in FIG. 13 and the contents of the virtual logical unit real storage area mapping table 215 is as shown in FIG. 4. As such, according to this embodiment, as a storage area is dynamically allocated, overhead due to division by a predicted amount of allocation amount or initialization of the divided storage area when data in size exceeding the fixed allocation size never occurs. That does not decrease input and output performance of the host computer.

Although the present invention has been described as the embodiments, another embodiment 1 of the present invention is a computer system wherein the management computer calculates allocation increment amount to the allocated storage area based on the allocation frequency, the total allocation size, and continuity of the allocated areas.

Another embodiment 2 of the present invention is a computer system including a storage system comprising one or more storage devices with storage areas, a host computer which uses a storage area provided by the storage device, and a management computer for dynamically allocating the storage area provided by the storage device in response to an input/output request from the host computer, wherein the management computer monitors dynamic allocation of a real storage area to a storage area in the storage system, and calculates allocation increment amount to the allocated storage area until a certain period at a preset time based on the allocation frequency and the total amount of allocation.

Another embodiment 3 of the present invention is the computer system according to the embodiment 2, wherein the management computer calculates the allocation increment amount to the allocated storage area until the certain period based on the allocation frequency, the total size of allocation and the continuity of the allocated areas.

Another embodiment 4 of the present invention is a management computer for dynamically allocating the storage areas in response to an input/output request from a host computer, which is connected with a storage system comprising one or more storage devices with storage areas and uses the storage areas provided by the storage device, wherein the management computer monitors dynamic allocation of the real storage area to a storage area in the storage system and calculates allocation increment amount to the allocated storage area based on the allocation frequency and the total size of allocation.

Another embodiment 5 of the present invention is the management computer according to the embodiment 4, wherein the allocation increment amount to the allocated storage area is calculated based on the allocation frequency, the total size of allocation, and the continuity of the allocated areas.

Another embodiment 6 of the present invention is a management computer for dynamically allocating the storage areas in response to an input/output request from a host computer, which is connected with a storage system comprising one or more storage devices with storage areas and uses the storage areas provided by the storage device, wherein the management computer monitors dynamic allocation to the real storage area in the storage system and calculates allocation increment amount to the allocated storage area until a certain period at a preset time based on the allocation frequency and the total size of allocation.

Another embodiment 7 of the present invention is the management computer according to the embodiment 6, wherein the allocation increment amount to the allocated storage area until the certain period is calculated based on the allocation frequency, the total size of allocation, and the continuity of the allocated areas.

Another embodiment 8 of the present invention is a storage system for dynamically allocating the storage area in response to the input/output request from the host computer which comprises one or more storage devices with storage areas and uses the storage area provided by the storage device; wherein the storage system allocates increment to the allocated storage area, and the allocated increment amount is a value calculated based on the allocation frequency and the total sizes.

Another embodiment 9 of the present invention is the storage system according to the embodiment 8, wherein the allocation increment amount to the allocated storage area is a value calculated based on the allocation frequency, the total size of allocation, and the continuity of allocated areas.

Another embodiment 10 of the present invention is a storage system for dynamically allocating the storage areas in response to the input/output request from the host computer which comprises one or more storage devices with storage areas and uses a storage area provided by the storage device, wherein the storage system allocates increment to the allocated storage area until a certain period and the allocation increment amount is a value calculated based on the allocation frequency and the total allocation size.

Another embodiment 11 of the present invention is the storage system according to the embodiment 10, wherein the allocation increment amount to the allocated storage area until the certain period is a value calculated based on the allocation frequency, the total size of allocation and the continuity of the allocation area in the computer system.

Another embodiment 12 of the present invention is a storage area allocation amount controlling method in a computer system comprising a storage system including one or more storage devices with storage areas, a host computer which uses storage areas provided by the storage device, and a management computer for dynamically allocating a storage area provided by the storage device in response to an input/output request from the host computer, wherein dynamic allocation of a real storage area to the storage area in the storage system is monitored, the allocation increment amount to the allocated storage area is calculated based on the allocation frequency and the total size of the allocation.

Another embodiment 13 of the present invention is the storage area allocation amount controlling method according to the embodiment 12, wherein the allocation increment amount to the allocated storage area is calculated based on the allocation frequency, the total size of allocation, and the continuity of the allocated areas.

Another embodiment 14 of the present invention is the storage area allocation amount controlling method according to the embodiment 12, wherein the dynamic allocation of the real storage area to a storage area in the storage system is monitored, and the allocation increment amount to the allocated storage area until a certain area is calculated at a preset time based on the allocation frequency and the total size of allocation.

Another embodiment 15 of the present invention is the storage area allocation amount controlling method according to the embodiment 14, wherein the allocation increment amount to the allocated storage area until a certain period is calculated based on the allocation frequency, the total size of allocation, and the continuity of the allocated areas.

Another embodiment 16 of the present invention is the storage area allocation amount controlling method according to the embodiment 12, wherein the usage history of a virtual logical unit of the storage system is obtained.

What is claimed is:
1. A storage system comprising:
a controller providing a logical unit which is used by a host computer; and
physical storage devices, wherein the controller manages a first increment amount to a first continuous area in the logical unit, and a second increment amount to a second continuous area in the logical unit, wherein the controller allocates an unallocated area in the logical unit to a certain amount of storage area in the physical storage devices, in response to an input/output request from the host computer, wherein if an address of the input/output request is in the first continuous area, the certain amount is the first increment amount, wherein if an address of the input/output request is in the second continuous area, the certain amount is the second increment amount, wherein the controller updates the first increment amount or the second increment amount, in response to receiving an allocation amount from a management computer, wherein the first increment amount is smaller than a size of the first continuous area, wherein the second increment amount is smaller than a size of the second continuous area, and wherein if an address of the input/output request is a discontinuous area, which is not the first continuous area or the second continuous area, the certain amount is another value.

2. A dynamic allocation method for a storage system including physical storage devices, comprising:

providing a logical unit which is used by a host computer;

managing a first increment amount to a first continuous area in the logical unit, and a second increment amount to a second continuous area in the logical unit; and allocating an unallocated area in the logical unit to a certain amount of storage area in the physical storage devices, in response to an input/output request from the host computer, wherein if an address of the input/output request is in the first continuous area, the certain amount is the first increment amount, and wherein if an address of the input/output request is in the second continuous area, the certain amount is the second increment amount, updating the first increment amount or the second increment amount, in response to receiving an allocation amount from a management computer, wherein the first increment amount is smaller than a size of the first continuous area, wherein the second increment amount is smaller than a size of the second continuous area, and wherein if an address of the input/output request is a discontinuous area which is not the first continuous area or the second continuous area, the certain amount is another value.

* * * * *